Aug. 24, 1965 G. B. KLINEFELTER 3,202,168
AIR VALVE FOR HEATING SYSTEMS
Filed Jan. 17, 1963
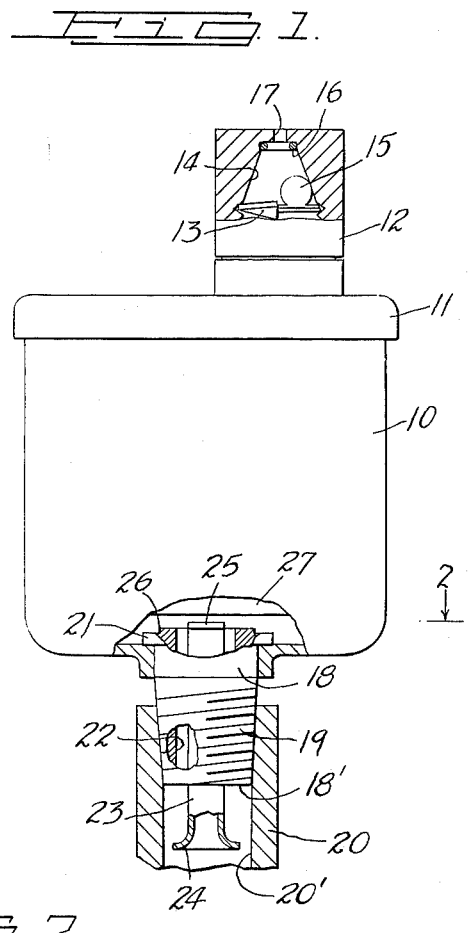
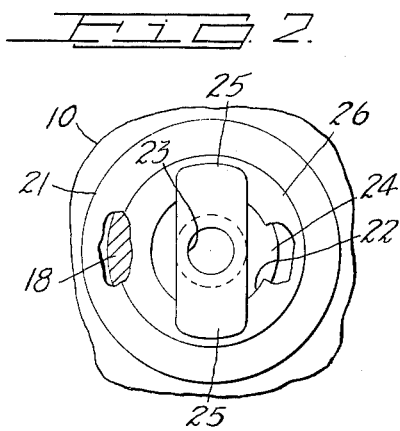
INVENTOR.
GLENN B. KLINEFELTER
BY
Howard E. Thompson
ATTORNEY

3,202,168
AIR VALVE FOR HEATING SYSTEMS
Glenn B. Klinefelter, Mountainside, N.J., assignor to Gorton Heating Corporation, Cranford, N.J., a corporation of New York
Filed Jan. 17, 1963, Ser. No. 252,072
2 Claims. (Cl. 137—202)

This invention relates to valves controlling the discharge of air, liquids or the like for radiators. More particularly, the invention deals with a valve for use in connection with hot or other fluid heating systems for controlling the release of air in the system while preventing discharge of water or liquid from the system.

Still more particularly, the invention deals with a valve of the character described having means controlling by-passage of air around a liquid flow tube at the lower admission end of the valve to insure transmission of air into the valve casing and to the control discharge end thereof.

The novel features of the invention will be best understood from the following description, when taken together with the accompanying drawings, in which certain embodiments of the invention are disclosed and, in which, the separate parts are designated by suitable reference characters in each of the views and, in which:

FIG. 1 is an enlarged side and sectional view of a valve made according to my invention, with parts of the construction shown in elevation and with parts broken away; and FIG. 2 is an enlarged sectional detail view on the line 2—2 of FIG. 1.

The present application deals with a valve structure generally of the type and kind disclosed in my prior application Serial Number 205,885, filed June 28, 1962, now Patent No. 3,149,640 issued September 22, 1964, and deals primarily with the control of air in passage from the radiator into the casing of the valve. In the drawing, 10 represents the casing of the valve, having a cover at its upper end, as indicated at 11, upon which is arranged an air discharge control device 12, generally of the type and kind disclosed in the application referred to above. Arranged in the device 12 is a flow control disc 13, above which is a conical chamber 14, in which a spherical member 15 is arranged, which is adapted to seat on a ring 16 inwardly of the discharge 17 of said device. In some uses of the device 12, the spherical member 15 is preferably buoyant. Suitably fixed in the lower end of the casing 10 is a nipple 18 threaded, as seen at 19, to engage a pipe or tubular portion 20 of a radiator. The upper or inner end of the nipple is flanged, as seen at 21, to seat on the bottom wall of the casing 10 and the nipple has a bore 22 extending therethrough.

Mounted in the bore 22 is a smaller diameter liquid feed tube 23, the lower end of which is flared, as seen at 24, the flare being of less diameter than the bore 20' of the pipe 20, as clearly indicated in FIG. 1 of the drawing. The tube 23 is of greater length than the nipple and has, at its upper end, laterally extending wings 25, which are adapted to lie upon the upwardly offset portion 26 of the nipple 18 in checking downward movement of the tube 23. The lower flared end 24 of the tube 23 is slightly greater in diameter than the diameter of the bore 22, thus retaining the tube 23 against displacement from the nipple. At 27 I have shown the lower end portion of the float usually employed in the casing 10 and, in actual use, this float will check upward movement of the tube 23 in the casing 10 to the extent that, in the use of the valve, the lower flared end 24 is at all times maintained in spaced relationship to the lower end 18' of the nipple, so as to provide free passage of air around the tube and upwardly through the bore 22 into the casing 10. It will also be understood that, in operation of the valve, water which may rise in the bore 20' will be directed primarily through the tube 23 into the casing 10 in actuation of the float 27 in performing the normal functions or operations of the valve in control of passage of air into the conical chamber 14 and the check provided by the spherical member 15 in seating on the ring 16 to prevent discharge of water through the passage 17, as with other devices of this type and kind. The primary purpose of my present conception deals with the provision of means assisting and controlling passage of air through the nipple and breaking up, to a degree, the liquid flow, so that air may be freely injected into the casing 10 for a more efficient and positive control of the valve device.

Having fully described my invention, what I claim as new and desire to secure by Letters Patent is:

1. In air valve devices for hot water heating systems, a valve casing including a bottom wall, a nipple mounted in and projecting from said bottom wall, said nipple being adapted to be coupled with a radiator, said nipple having a bore extending completely therethrough, a liquid feed tube arranged in and extending longitudinally of said nipple, said tube being greater in length than the length of said bore and having an outside diameter materially smaller than the diameter of the bore of said nipple, the upper end of said feed tube having a pair of laterally extending wing portions lying within the outside diameter of said tube for seating said tube upon the upper end of said nipple within the casing of the device, the lower end of said feed tube having an outwardly flared annular portion greater in diameter than the diameter of said bore, and said flared portion, in combination with said wing portions, retaining the nipple and tube in an assemblage.

2. In an air valve for hot water heating systems employing a valve casing, a nipple and liquid feed tube assemblage for mounting in a bottom wall of said casing, said nipple having a bore extending completely therethrough, said tube being arranged in and extending longitudinally of said bore, said tube having an outside diameter less than the diameter of said bore, said tube being longer than the length of said bore, means at ends of said tube checking movement of the tube in both directions in said nipple and for retaining the tube in assemblage with said nipple, the means at one end of the tube comprising laterally extending wings, the width of said wings being within the outside diameter of said tube, and the means at the other end of said tube comprising an outwardly flared annular portion.

References Cited by the Examiner
UNITED STATES PATENTS

| 2,300,962 | 11/42 | Pratt | 137—202 X |
|---|---|---|---|
| 2,510,825 | 6/50 | Lechtenberg | 138—114 X |
| 2,516,225 | 7/50 | Lund | 137—202 |
| 2,633,142 | 3/53 | Woolley | 137—202 |
| 2,970,610 | 2/61 | Johnston | 137—592 |
| 3,002,522 | 10/61 | Klinefelter | 137—202 |

ISADOR WEIL, *Primary Examiner.*
WILLIAM F. O'DEA, *Examiner.*